Oct. 6, 1942.        J. R. BOST ET AL        2,298,030
PHOTOVOLTAIC CELL
Filed Sept. 16, 1940

Inventors:
John R. Bost
and Thomas Gordon Ladshaw
By Eaton & Brown
Attorneys

Patented Oct. 6, 1942

2,298,030

UNITED STATES PATENT OFFICE 2,298,030

PHOTOVOLTAIC CELL

John R. Bost and Thomas Gordon Ladshaw, Jr., Spartanburg, S. C.

Application September 16, 1940, Serial No. 356,990

11 Claims. (Cl. 136—89)

Our invention relates to a photovoltaic cell and more especially to an improved electrolyte and light sensitive element for such a cell.

An object of our invention is to provide a photosensitive cell that operates with such high efficiency that the cell may be used for converting solar radiation into electrical power of sufficient magnitude to operate various electrical appliances and industrial equipment.

We are aware of photovoltaic cells made heretofore for electric circuit use, where very small currents are needed. A common example of these cells uses a copper electrode having a coating of copper oxide produced thereon to render the element light sensitive. This copper oxide is in the lower valent form, namely, cuprous oxide.

In accordance with our invention, we have found that substantially higher photosensitivities can be obtained by employing an electrode having a coating of copper of the higher valent form, namely, cupric oxide CuO; and that higher current outputs are obtainable from a cell using such an electrode in combination with an electrolyte of the type described below.

We have found that the combination of the cupric oxide coated electrode and an electrolyte containing an acetic solution of an alkali metal will produce the best results. As a commercially advantageous example, we propose to use a solution of potassium acetate, made acid with glacial acetic acid and having an excess of acetate ions. For practical reasons, we prefer to use the salts of potassium, although the results contemplated in our invention can be obtained, if desired, by use of the salts of other alkali metals, i. e., sodium, caesium, rubidium, and lithium. In each of these cases, we have found it of advantage to use salts of these alkali metals rather than the solutions of the metals alone, such as the hydroxides.

In preparing the salt of the alkali metal, we find that we may use various organic and inorganic acids. For example, formic, boric, benzoic, tannic, sulphuric, hydrochloric and nitric acids. In the usual case, we combine one or more of these acids with potassium hydroxide to form the potassium acetate, formate, etc.

We have obtained our best results using acetic acid in combination with potassium hydroxide, that is to form a potassium acetate salt. Also, as above indicated, we prefer to make the solution of potassium acetate or similar salt solution, acid by the addition of excess acid such as acetic acid.

In connection with the acidity of the electrolyte solution we have discovered that the operation of the cell will vary substantially with varying acidities. From tests that we have made, we find that to produce the best efficiency of operation of the photovoltaic cell, the electrolyte solution should have an acidity falling within a definite pH range. While some reasonable variations from this range may be permitted, we recommend for best results that the pH of the electrolyte solution be within the range of about 5.6 to 5.8.

As an advantageous commercial example, we suggest the use of an electrolyte having a pH of about 5.72. These pH values are based upon measurements at approximately 25° C.

We have observed in the development of our invention that cupric oxide produces a negative charge in contrast with the positive charge produced by the use of cuprous oxide on the plates. Accordingly, the illuminated surface of the plates, used in our cell, has a negative charge in contrast with the positively charged illuminated electrode in the conventional cuprous oxide cell.

With regard to the form and material of the electrodes for our photovoltaic cell, we have tested several materials including copper, iron, zinc and aluminum. Our best results indicate generally, however, that copper plates should be used to obtain the best photoactivity and general efficiencye in operation of the cell. With respect to the copper plates, we have tested heat-treated plates having a coating of cuprous oxide ($Cu_2O$), which is characterized by the well-known red color of cuprous oxide. While these plates develop some photoactivity, we found that they were not nearly as efficient as copper plates having a coating of copper of higher valent form, i. e., cupric oxide. Our best results have been obtained by a combination of copper plates having a uniform coating of cupric oxide CuO which has a characteristic black color with an electrolyte comprising potassium acetate of an acidit within the above prescribed pH range. With this combination, we obtained measured photoelectric currents of about 10 milliamperes with a quarter volt, when the cell plates were energized by light from a 25 watt tungsten filament lamp held ¼" from one of the plates. This same type of cell when subjected to direct strong sunlight produced a current of about 20 milliamperes.

One of the features of the copper plates used in our cells is that one side of each plate is insulated with a suitable material such as for example, tar or enamel, or similar water-proof electrical insulator. The reason for providing this insulation on one face of the cell plates is that the plate, when exposed to light, is negatively charged on the cupric oxide surface and positively charged on the opposite face. Accordingly, if this insulated surface were not provided there would be a counteraction between opposite faces of the copper plate and thereby reduce the efficiency of the cell.

Our experience has been that it is necessary, or at least advisable, to reverse the illumination periodically for opposite faces of the cell. Where the cell is made up of two or more plates, we find that it is best to illuminate one of the plates for about four to six hours and then illuminate the opposite plate for a similar period. This gives the first plate an opportunity to recuperate.

The following are illustrative but non-limiting examples of cells and particularly electrolyte solution for the cells which we have satisfactorily used. The cells in these cases, each employ pure copper plates having a cupric oxide deposit on one face and a coat of insulation on the reverse side:

*Example No. I*

The electrolyte in this example contained 5 cc.'s of potassium acetate solution (10 grams of potassium acetate in 60 cc.'s of water); 1/20 cc. of concentrated nitric acid and 300 cc.'s of water.

The results obtained from this cell were 9 milliamperes when using a 25 watt incandescent lamp as the source of illumination for the cell.

*Example No. II*

This solution contained 20 cc.'s of potassium acetate solution (10 grams of potassium acetate in 60 cc.'s of water); 1/10 cc. glacial acetic acid; 300 cc.'s of water.

This gave a minimum reading of 13 milliamperes using a 60 watt lamp for illumination.

*Example No. III*

This solution contained 20 cc.'s of potassium acetate solution (10 grams of potassium acetate in 60 cc.'s of water); 1/5 cc. of glacial acetic acid; 300 cc.'s of water.

This cell gave a reading of 9.5 milliamperes using a 25 watt lamp for illumination. This is one of the preferred examples of our cell.

*Example No. IV*

20 cc.'s of potassium acetate solution (10 grams of potassium acetate in 60 cc.'s of water); 1/10 cc. glacial acetic acid and 310 cc.'s water.

This cell gave a reading of 40 milliamperes at 1/4 volt when subjected to direct sunlight.

At times this cell produced a reading as high as 60 milliamperes although this output was somewhat sporadic.

In the examples hereinabove given, of tests conducted by using as a source of light, an incandescent lamp disposed a given distance from the plates of the cell, it is to be understood that in many instances, the exact distance of the source of light from the plates is not critical with respect to the output of the cell. The reason for this is that when the source of light is moved very close to the cell plates, there will be a temporary increase in electrical output, but this will shortly fall to the uniform maximum output of the plates. Therefore, the light source can be moved away from the plates a proper amount so long as it is not far enough away to cause the electrical output generated by the plate to fall below the uniform maximum output. For example, it may be that when the plates are exposed to sunlight, the amount of light striking the plates will be substantially above the amount required to produce the maximum output. This will have the additional advantage of causing the cell to give a maximum output, even on days when the sun is not at its brightest, such as hazy days or partly cloudy days.

By the term "maximum output" we mean that current output which may be obtained from the cell uniformly over an extended period of time. The desired maximum output value may be obtained or regulated by means of suitable resistors such as for example a storage battery or motor located in the output circuit.

To prepare the plates for our cell, such as those described above in connection with Examples 1 to 4, we usually give the cell plates an electric treatment to produce the desired photoactivity on the plates. This may be done for example by passing a direct current of suitable voltage and low amperage such as 40 milliamperes through the plates for a period ranging from about 4 to 7 hours, and then give the cell plates a rest period for about one day before repeating this treatment or before using the cell. When preparing the plates, the acidity of the solution can be increased slightly above the desired pH range given herein, and thereby shorten the time required for the preparation of the plates by the depositing of the proper film of cupric oxide thereon.

In raising the acidity of the solution for the preparation of the plates, it sometimes happens that there is deposited on top of the cupric oxide, a green deposit. When this occurs, it should be removed by removing the plate from the solution, and using a suitable abrasive thereon, and then the plates will be ready for use in the photovoltaic cell.

The structural form and arrangement of the cell and the cell plates used in our invention may vary considerably and in fact the cell may be made up according to any desired suitable form normally employed for photovoltaic cells. For the purpose of illustrating one such form of cell, but without limiting our invention thereto, we have shown the cell in the accompanying drawing, in which—

Figure 1:
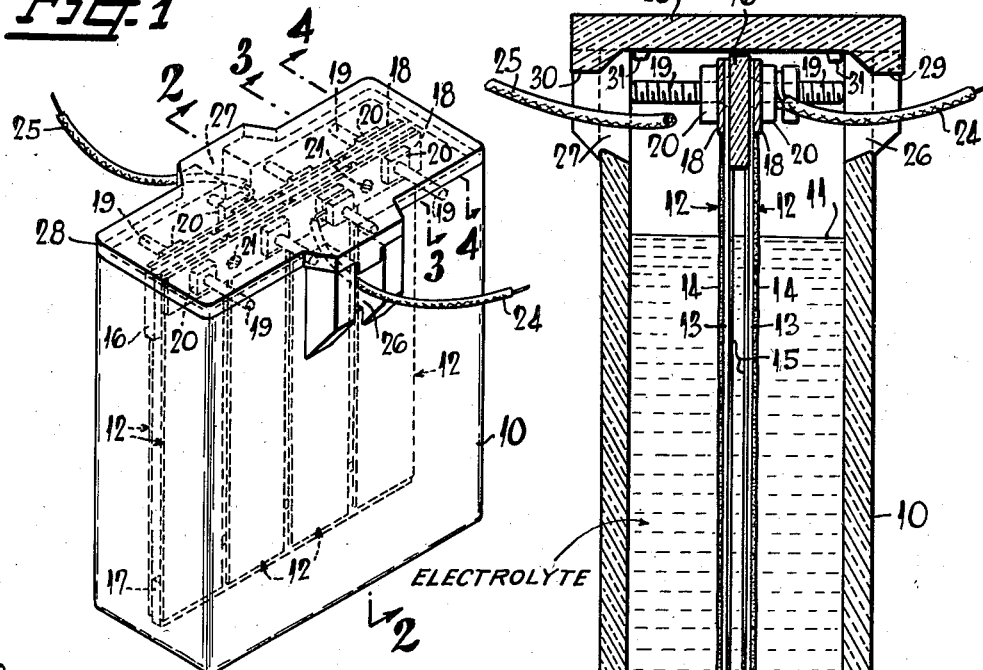
Figure 1 is an isometric view of the cell.
Figure 3:
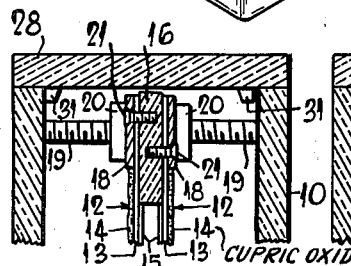
Figure 4:
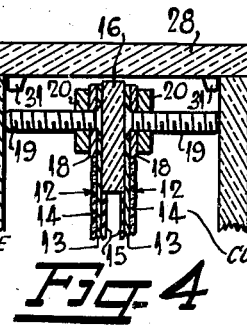

Figures 3 and 4 are detail sectional views taken along the lines 3—3 and 4—4 respectively of Figure 1.

Figure 2:
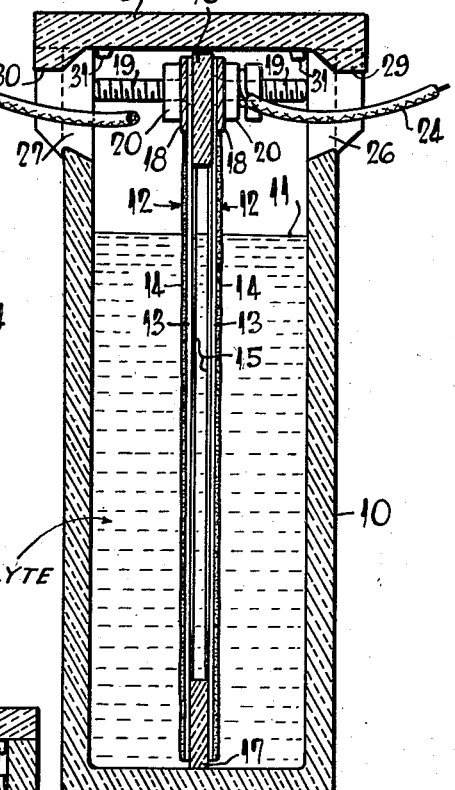
Figure 2 is a sectional view taken along the line 2—2 of Figure 1.

Referring to these several figures, the cell shown therein comprises generally, a glass container 10 which is filled to a suitable height with the electrolyte solution as indicated at 11. Located inside of this glass container are a series of copper plates shown generally at 12. Each of these cell plates comprises a sheet of pure copper 13, a coating of cupric oxide 14 on the exposed face of the plate and a coating of insulating material 15 on the reverse side of the plate as indicated more clearly in Figure 2.

Each cell plate, in accordance with this specific, but non-limiting embodiment, is made up of two sets of the sheets of copper with cupric oxide and insulating coating as above described, located in opposing relationship; the two sets being separated by spacers 16 and 17 at the upper and lower extremities of the plates. These spacers serve primarily the purpose of preventing the two components of the dual cell plate from touching and thereby provide the proper electrical operation of the cell.

The upper ends of plates 12 have transverse bars 18 secured thereto by any suitable means such as machine bolts 19. It will be seen by observing Figure 4 that the heads of bolts 19 are countersunk in copper plates 13 so that these plates can be positioned face to face with the insulating spacer bar 16. Suitable nuts 20 are threadably secured on bolts 19 for binding members 12 and 18 together. Bolts 19 also serve to effect suitable positioning of the plates 12 relative to the interior of the container 10. The width of bar 16, plus the combined length of two of the bolts 19 is substantially the same as the distance between the proximate interior faces of the container, thereby positioning the cell plates substantially in the center.

The two sets of plates are secured to the upper spacer bar 16 by any suitable means such as screws 21 (see Figures 1 and 3), these screws being adapted to penetrate transverse bars 18 at points between plates 12 and the ends of these screws being threadably or otherwise secured in spacer bar 16. It is therefore seen that the two sets of plates are bound together in a unit and are properly insulated from each other.

Wires 24 and 25 are connected at opposite sides of the cell plates as shown to provide electrical connections to the cell plates and to serve as conductors for the photoelectrical current output of the cell. These wires lead from the cell through suitable openings 26 and 27 cut in the upper portion of the container. A suitable cover 28 is provided for the cell, said cover having downwardly projecting lugs 29 and 30 integral therewith which are adapted to removably fit in openings 26 and 27, respectively, to hold the cover in the container against longitudinal movement. Other lugs 31 extend downwardly from the cover and fit within the container rim to prevent transverse movement of the cover.

It will be understood that this cell may be operated in the conventional manner by any suitable source of light such an incandescent lamps, or the sun, and having the cell, so positioned that the light shines through the glass container 10 and strikes the cupric oxide surface of the cell plates 12.

When this cell is operated in the open, the rotation of the earth provides the necessary change in exposure of the cell plates, as the cell can be positioned so that one set of plates will receive the sun's rays until mid-day and the other set of plates will receive the post meridian rays.

Various modifications and changes may be made in the above described cell arrangement, cell plates and electrolyte without departing from the scope of our invention, as indicated by the appended claims.

We claim:

1. A photovoltaic cell comprising a photosensitive electrode having a cupric oxide light-receiving surface and on electrolyte substantially covering said surface and comprising an acidic solution of a salt of an alkali metal and a cooperating electrode.

2. A photovoltaic cell having a photosensitive electrode with a cupric oxide light-receiving coating and a cooperating electrolyte solution having a pH of about 5.6 to 5.8 and containing in the solution a salt of an alkali metal and a cooperating electrode.

3. A photovoltaic cell having a photosensitive electrode and a cooperating acidic electrolyte solution, said solution comprising potassium acetate having an excess of acetate ions and a cooperating electrode.

4. A photovoltaic cell having a cupric oxide-coated electrode immersed in a solution of potassium acetate and a relatively small amount of acetic acid and a cooperating electrode.

5. In a photovoltaic cell having a series of copper plates coated with cupric oxide, an improved electrolyte comprising a solution of potassium salt having a pH between 5.6 and 5.8.

6. In a photovoltaic cell having a series of copper plates coated with cupric oxide, an improved electrolyte comprising a solution of potassium acetate having a pH of about 5.72.

7. A photovoltaic cell as defined in claim 1, in which the cupric oxide-coated electrode has a negative charge during operation of the cell.

8. A photovoltaic cell comprising two cupric oxide-coated copper electrodes immersed in a solution of an alkali metal made acid by the addition of a suitable quantity of an anion, said cell having the property of reversing its polarity, with change of illumination of one electrode to the other electrode.

9. A photovoltaic cell comprising two cupric oxide-coated electrodes, one of which is illuminated during operation of the cell and has a negative charge and the other is not illuminated during operation and has a positive charge, and an electrolyte substantially covering said electrodes.

10. In a photovoltaic cell having two electrodes, each comprised of a number of relatively small electrodes paralleled, all of which are similarly treated with cupric oxide (CuO) immersed in a solution of potassium salt having a pH of about 5.6 to 5.8.

11. In a photovoltaic cell having two electrodes, each comprised of a number of relatively small electrodes paralleled, all of which are similarly treated with cupric oxide (CuO) immersed in a solution of potassium salt having a pH of about 5.72.

JOHN R. BOST.
THOMAS GORDON LADSHAW, Jr.